United States Patent [19]
Cronyn

[11] Patent Number: 4,991,165
[45] Date of Patent: Feb. 5, 1991

[54] DIGITAL ADAPTIVE INTERFERENCE CANCELLER

[75] Inventor: Willard M. Cronyn, San Diego, Calif.

[73] Assignee: The United States of America as represented by the Secretary of the Navy, Washington, D.C.

[21] Appl. No.: 251,142

[22] Filed: Sep. 28, 1988

[51] Int. Cl.⁵ .............................................. H04B 1/56
[52] U.S. Cl. ......................................... 370/32; 455/79
[58] Field of Search ...................... 370/24, 32, 38, 40; 342/202, 379; 455/78, 79, 80, 81, 82

[56] References Cited

U.S. PATENT DOCUMENTS

| | | | |
|---|---|---|---|
| 3,113,269 | 12/1963 | Essam | 370/24 |
| 3,696,429 | 10/1972 | Tressa | 455/79 |
| 3,699,444 | 10/1972 | Ghose et al. | 455/79 |
| 3,810,182 | 5/1974 | White et al. | 455/79 |
| 4,423,505 | 12/1983 | Greig | 370/32 |

Primary Examiner—Benedict V. Safourek
Attorney, Agent, or Firm—Harvey Fendelman; Thomas G. Keough

[57] ABSTRACT

An interference canceller for cancelling an interfering signal generated by an interfering source from a transmission link between an antenna and a receiver. The interference canceller derives a sample of the interfering signal from the interfering source and down converts the sample to an intermediate frequency. A computer controlled delay path and computer controlled amplitude and phase modulator interatively adjusts a cancellation signal that is injected into the transmission link between the antenna and receiver to maximize the amplitude match between the cancellation signal and the interfering signal, and anti-phase the cancellation signal with respect to the interfering signal.

13 Claims, 2 Drawing Sheets

DIGITAL ADAPTIVE INTERFERENCE CANCELLER

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates generally to the field of devices for reducing interference to a desired signal caused by interfering signal sources. More particularly, the present invention relates to radio frequency apparatus and to those devices which are used to cancel unwanted, interfering signals that may appear in a transmission link between an antenna and a receiver.

There are a number of techniques which have been developed to reduce the effects of interference which may appear on a transmission line which also carries a desired signal. For instance, if the desired signal and the interference are separated in frequency, filters may be used which pass the desired signal and suppress the interference. However, if a filter is used, frequency components of the desired signal which fall within the rejection band will also be suppressed. Filters can introduce significant attenuation even for the desired signal. A filter can also introduce significant absolute and differential group delay times. It is known, for instance, that the absolute group delay time through a band reject filter is approximately the inverse of the pass bandwidth of the filter. For example, the absolute delay time through a 5 MHz bandwidth reject filter will be about 200 nanoseconds.

A further alternative to cancelling interfering signals is the technique of blanking the input to the receiver during the time the interference is present. With this technique, however, no signal can be received during the blanking period. Therefore, this technique is only effective if the blanking does not eliminate a significant fraction of the desired signal. Therefore blanking cannot be used if the interfering signal is continuous or has a high duty cycle. Furthermore blanking requires either a hard-wired connection to the interfering signal or some other technique e.g., predictive analysis, to derive timing information for blanking activation.

Another alternative is that of combining blanking with the use of band reject filters. In this technique, the filter is switched in only during the time the interference is present. However, utilization of this technique still results in significant time-varying group delay propagation times through the filter during the time period in which the filter is switched in and out and also still introduces time-varying differential group delay time.

A still further alternative solution to the problem of cancelling interference is the use of a signal canceller. A prior art signal canceller system is illustrated by way of example in FIG. 1. As is illustrated in FIG. 1, an interfering signal is generated by interfering transmitter 12 and is propagated along transmission line 14 to antenna $A_i$ which radiates the interfering signal. Antenna $A_s$ receives a desired signal and this desired signal is propagated along transmission line 16 to signal receiver 18. Because of coupling from $A_i$ to $A_s$ the signal receiver receives an admixture of both the desired and interfering signals. The interfering signal level $S_i$, at the output of $A_s$, is:

$$S_i(t) = Gs_i(t-t_i) \qquad (1),$$

where
- $S_i$ = amplitude of interfering signal at input to $A_i$;
- G = the coupling coefficient from DC1 to DC2 via the $A_i$-$A_s$ antenna coupling path; G is a complex coefficient specifying both the amplitude and phase of the coupling coefficient;
- $t_i$ = group delay time from DC1 to DC2 via the $A_i$-$A_s$ antenna coupling path.

In order to cancel the interfering signal, $S_i$, a sample of the interfering signal taken at directional coupler DC1 is injected through directional coupler DC2 into the receiver transmission line 16 at a signal level $S_j$. The level of cancelling signal $S_j$ is:

$$S_j(t) = gs_i(t-t_j) \qquad (2),$$

where
- $s_i$ = amplitude of interfering signal at input to $A_i$;
- g = the coupling coefficient from DC1 to DC2 via the interference injection coupling path; g is a complex coefficient specifying both the amplitude and phase of the coupling coefficient;
- tj = group delay time from DC1 to DC2 via the interference injection coupling path.

The resultant sum will be:

$$S_i(t) + S_j(t) = Gs_i(t') + gs_i(t'-td) \qquad (3),$$

where
- $t' = t - t_i$;
- $td = t_j - t_i$, the difference in group delay propagation time between the antenna coupling path and the injection path.

As can be seen from equations (1), (2), and (3) above, for perfect cancellation $g = -G$ and $td = 0$. In practice there will be errors, possibly time-varying errors which will result in a residual interfering signal which can be sampled at coupler DC3. The residual signal must be measured and refinements made in the amplitude, phase and group delay propagation time of the injected signal to further reduce the amplitude of the residual signal. Thus the canceller utilizes a null-seeking feed-back loop. Analog implementations of the feed-back loop to control the amplitude and phase of the injected signal have been utilized for a number of canceller applications. However, hard-wired analog control of the feedback loop is unsatisfactory or difficult to implement, and is inflexible in any case, for many system configurations, particularly those in which there is low-duty cycle frequency-hopping and/or wide-band interference, variations in coupling G or group delay $t_d$ e.g., mechanical or electrical rotation of $A_i$, and/or $A_s$, and a wide variety of other complex system configurations and modes.

SUMMARY OF THE INVENTION

Accordingly, the present invention overcomes the shortcomings of the analog canceller illustrated in prior art FIG. 1 by providing digital, computer control of the minimization of the residual signal appearing on the transmission link between the signal receiver and the antenna used for receiving the desired signal. Because the present invention is digitally implemented, the processing of pulsed interference elimination is facilitated. Since in many cases the interfering emitter can also provide a pre-trigger pulse, such pre-trigger pulse, suitably delayed, can serve as a sampling pulse for analog-to-digital conversion precisely centered on the peak of the residual signal.

In accordance with the present invention the computer used in the canceller controls the time delay introduced into the signal injected into the desired signal transmission link between the antenna and the signal receiver and also controls the amplitude and phase modulation of the injected signal in accordance with a minimization algorithm. The computer is furnished with information from an amplitude/phase detector/correlator that receives a sample of the residual signal propagating in the desired signal transmission link and compares that signal sample against the injected signal. By using a matrix-inversion minimization algorithm the difference between the residual signal and the injected signal is determined and the delay time, the amplitude and the phase of the injected signal are corrected to minimize the residual signal to as nearly close to a zero value as is possible.

One of the advantages of the digital canceller of the present invention is that ancilliary external digital data can be integrated into the control of the canceller. For example, in one suitable application for the present invention, the interfering signal is electronically rotated from beam position to beam position. Since the amplitude and phase of the interfering signal varies in a predictable, periodic fashion as the beam rotates, the computer controlled digital adaptive interference canceller of the present invention can use the digital beam number as a memory pointer to retrieve the vector modulator control coefficients appropriate for each beam position.

Even if the interfering signal is radiated from a mechanically rotated antenna, the computer of the present invention makes it possible to measure its amplitude, phase and group delay as a periodic function of time. If the antenna is rotated at a constant rate, the vector modulator and RF delay line control words generated by the computer can be periodically clocked out of canceller-dedicated memory to achieve cancellation. Interference from emitter antennas which are not rotated at a constant rate can be cancelled on the basis of prior measurements if the antenna bearing angle can be read into the canceller. Finally, interference from a periodically rotating antennas with no bearing angle read out can be cancelled through pulse-to-pulse injection and residual measurement. In this case the effectiveness of the cancellation depends upon the extent to which the phase and amplitude varies from pulse to pulse as the relative antenna positions change.

The digital adaptive interference canceller of the present invention is particularly suitable for use in applications where the interfering emitter emits a frequency-hopping signal even on a pulse-to-pulse time scale. For applications of the present invention for utilization with such frequency hopping emitters, a "pre-hop" digital control word specifying frequency can be outputted from the frequency hopping emitter to the adaptive interference canceller of the present invention. Again, the appropriate vector modulator control coefficients can be computed from measurements and stored.

The present invention has the further advantage of having the ability to be time shared if there are a number of interfering emitters provided only that the emitters are pulsed. In such a configuration there would be required only one directional coupler sampler such as DC1 in FIG. 1 for each emitter and a digital data word to the digital adaptive interference canceller of the present invention indicating the identification of the current interfering emitter. Again, in this application appropriate vector modulator and RF delay line control coefficients can be clocked from the computer memory. The emitter identification word would also switch the injection input to the interference canceller of the present invention to the current interfering emitter. Thus, the expensive resources of the interference canceller could be time shared among all interfering emitters with only very occasional conflicts between emitters for control of the interference canceller.

OBJECTS OF THE INVENTION

Accordingly, it is the primary object of the present invention to disclose a signal interference canceller that is digital and computer controlled.

It is a further object of the present invention to disclose a novel digital signal interference canceller.

It is another object of the present invention to disclose a signal interference canceller that is programmable.

Another object of the present invention is the disclosure of a signal interference canceller that is suitable for use to cancel signals emanated from frequency hopping interfering emitters.

A still further object of the present invention is to disclose an interference canceller that may be time shared if there are a number of interfering emitters.

These and other objects of the invention will become more readily apparent from the ensuing specification when taken together with the drawings.

DESCRIPTION OF THE PREFERRED EMBODIMENT

Figure 1:
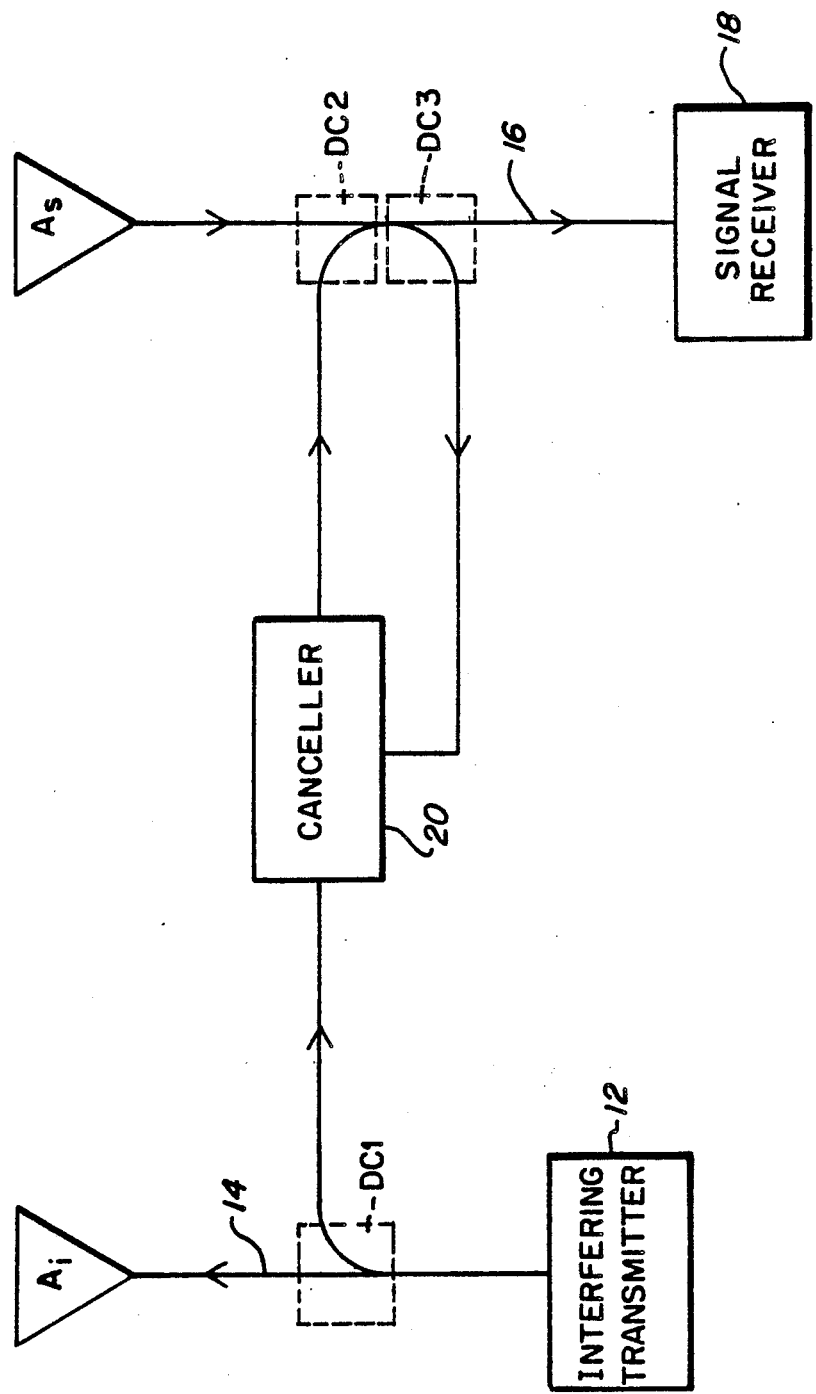
FIG. 1 is a schematic block diagram of a prior art signal interference canceller.
Figure 2:
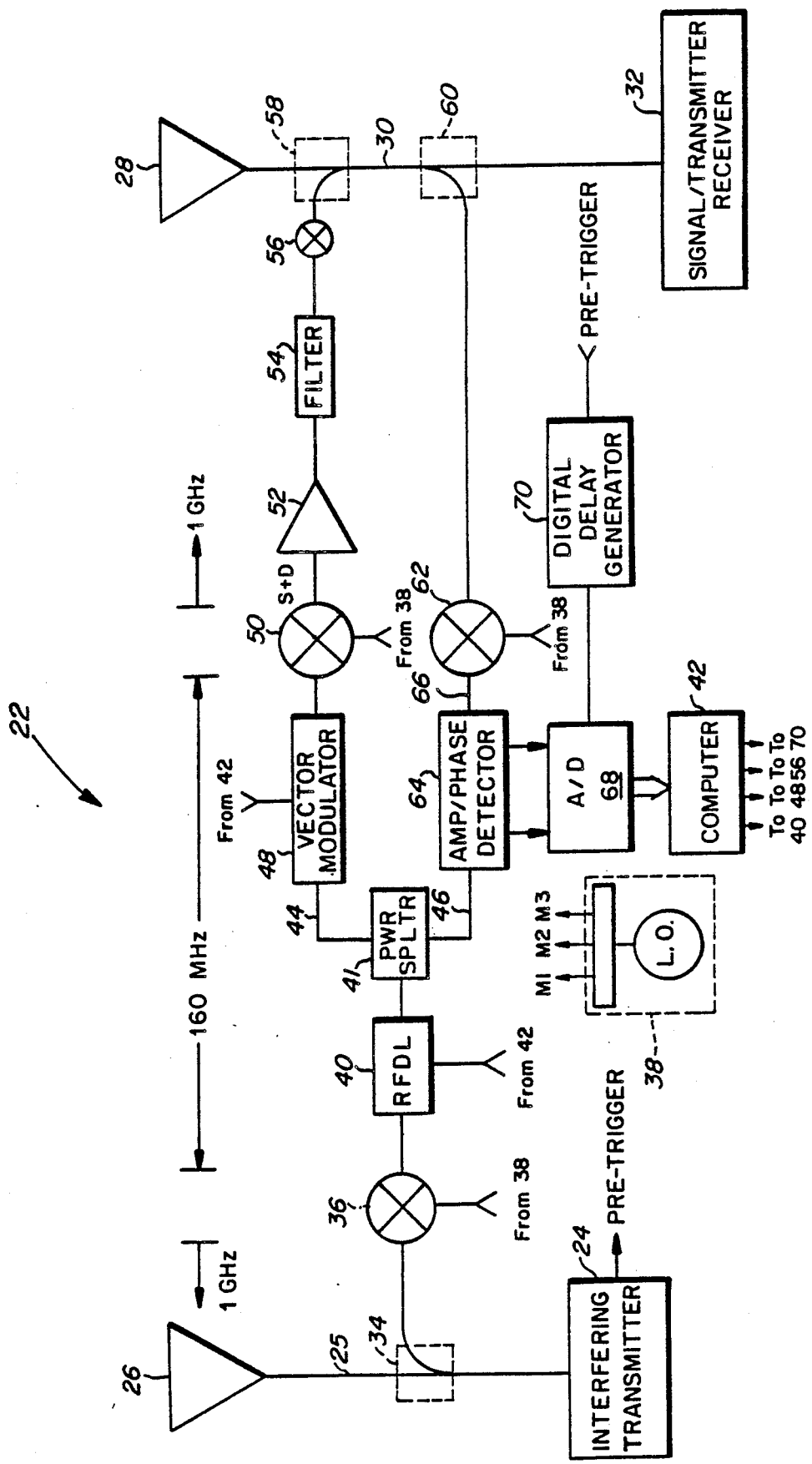
FIG. 2 is a schematic block diagram of the digital adaptive interference canceller of the present invention.

Referring now to FIG. 2 the preferred embodiment of the present invention will be described. FIG. 2 is a block diagram showing the digital adaptive interference canceller 22 of the present invention. The interference canceller 22 is illustrated in FIG. 2 by way of example for cancelling out an interfering signal generated by interfering transmitter 24 and radiated by interfering radiating antenna 26. In the system illustrated in FIG. 2 a desired signal is to be received by antenna 28 and propagated along transmission link 30 to signal transmitter/receiver 32. As can readily be appreciated the interfering antenna 26 may be in such close proximity to antenna 28 that the signal radiated from interfering antenna 26 may be received by desired signal antenna 28 and thereby appear at the input to signal receiver 32. This interfering signal is cancelled out by the components of the present invention described below. Directional coupler 34 is operably coupled to transmission link 25 between the interfering transmitter 24 and the interfering radiating antenna 26. The output of directional coupler 34 at, for example, 960–1215 MHz, is input to mixer 36; the other input is from tunable local oscillator 38, at, for example, a frequency of 800–1055 MHz.

Thus, the down-converted output of mixer 36, at a frequency of, for example, 160 MHz, is provided as one input to computer controlled RF delay line 40. The other input to computer controlled RF delay line 40 is derived from control computer 42 of the present invention. The output of RF delay line 40 is split by power splitter 41 into equal outputs onto transmission lines 44 and 46, respectively. Vector modulator 48 receives the signal propagated along transmission line 44 and phase and amplitude modulates the signal under the control of computer 42.

The delayed, phase and amplitude modulated signal output of vector modulator 48 is furnished to mixer 50 which receives its other input from local oscillator 38 and up-converts that signal. The up-converted signal, in two bands, for example, one at 960–1215 MHz and the other at 640–895 MHz, is amplified by amplifier 52; the lower frequency signal output from mixer 50 is filtered out by band reject filter 54. In order to protect the signal injection system modules 52 and 54 for system configurations in which a transmitter shares line 30, computer controlled switch 56 may be utilized between band reject filter 54 and directional coupler 58. The computer controlled switch 56 may be selectively opened and closed under control of the computer 42 or by other means (not shown) according to the application of the invention.

Directional coupler 58 is utilized to inject the cancellation signal onto transmission line 30 in order to cancel out the interfering signal received by antenna 28 from interfering signal antenna 26.

Directional coupler 60 is operably coupled to transmission line 30 for deriving a sample of the residual signal resulting from the sum of the interfering signal and the injected signal as will be described further below. This residual signal sample is down-converted by means of mixer 62 which receives its other input from local oscillator 38. The down-converted residual signal sample is provided as an input to amplitude/phase detector/correlator 64. The amplitude/phase detector correlator 64 receives its other input on transmission line 46 from the signal splitter 41 and comprises the down-converted time delayed interfering signal derived from RF delay line 40 via down-converter 36 and directional coupler 34. The amplitude/phase detector correlator 64 is a well known device and may comprise, for example, RHG Company model number DPD16020. Generally, amplitude/phase detector 64 compares the down-converted residual signal derived from directional coupler 60 and mixer 62 with the interfering signal derived from transmission line 46 as previously described. Any other signals such as spurious signals appearing on transmission link 30, or such as the desired signal appearing on transmission link 30, which are sampled by directional coupler 60 and which thereby appear at the output of mixer 62 and consequently at the input 66 of amplitude/phase detector correlator 64, are rejected by the correlator function of amplitude/phase detector 64. Accordingly, such signals are not compared with the interfering signal propagated on transmission line 46. The in-phase and quadrature-phase outputs of amplitude/phase detector 64 are furnished to analog-to-digital converter 68 which converts these analog signal components to digital signals which may, for example, be 12-bit signals for input to computer 42.

Computer 42 receives the output of analog-to-digital converter 68 and executes a residual minimization algorithm which adjusts the amplitude and phase of the injected signal via vector modulator 48 and which also may adjust the time delay of the injected signal via RF delay line 40. A listing attached as Appendix I hereto is provided by way of example and constitutes a source code listing written in HP Basic, including the above referred to minimization algorithm and suitable for use in programming computer 42 in implementing the residual minimization algorithm.

Referring again to FIG. 2 the interference canceller of the present invention operates as follows. A sample of the interfering signal generated by interfering transmitter 24, which will hereafter be referred to as the injection signal, $S_i$, defined in Equation (1) above, is taken via directional coupler 34 from transmission line 25 that couples interfering transmitter 24 with radiating antenna 26. It is assumed for purposes of this invention that the injection signal derived by directional coupler 34 is a time-shifted replica of the interfering signal that will be received by antenna 28 from antenna 26 through the free space path. The directional coupler 34 contributes only a few tenths of a dB attenuation to the interfering signal path between interfering transmitter 24 and interfering radiating antenna 26. The interfering signal sample which may, for instance, be in the frequency range of 960–1215 MHz, is then down-converted to an intermediate frequency by means of mixer 36. For this application, local oscillator 38 may be tuned, for instance, to 800–1055 MHz. The output of mixer 36 then comprises sum and difference frequencies resulting from the mixing function of mixer 36. The sum frequency output of mixer 36 is filtered out by RF delay line 40 and the difference frequency which may, for example, be in the frequency range of 160 MHz is passed through the computer controlled RF delay line 40 which fine tunes the delay through the transmission line, electronic component cancellation path between directional coupler 34 and injection directional coupler 58 to be the same as the delay in the coupling path from directional coupler 34 via antenna 26 via free space to the antenna 28 and then through transmission line 30 to directional coupler 58.

Power splitter 41 divides the signal output of RF delay line 40 into equal amplitude components onto transmission lines 44 and 46, respectively. The transmission line 44 component of the time-delayed, down-converted injection signal is furnished to the input of computer controlled vector modulator 48 which adjusts the amplitude of the injected signal $S_j$ injected via directional coupler 58 into transmission line 30 to be the same as the amplitude of the interfering signal $S_i$. Further, the vector modulator 48, under control of computer 41, adjusts the phase of the injected signal $S_j$ to differ by 180° from that of $S_i$. The resultant signal from the output of vector modulator 48 is then up-converted back to its original frequency and amplified by amplifier 52. The difference component output of mixer 50 is filtered out by bandpass filter 54 and the sum component output at, for example, 960–1215 MHz is passed through filter 54 through switch 56 to directional coupler 58 which injects the signal $S_j$ into transmission line 30 for cancellation of the interfering signal $S_i$. Filter 54 also eliminates spurious components introduced in the up-conversion process that appear at the output of mixer 50. Switch 56 is used to isolate and protect the output of amplifier 52 from any transmitter sharing line 30.

The residual signal sum $S_i + S_j$ is sampled by directional coupler 60 and this signal sum is down-converted by means of mixer 62. Amplitude/phase detector/correlator 64 has two inputs. The first input is the time-delayed down-converted sample portion of interfering signal $S_i$ appearing on transmission line 46 at the output of power splitter 42. The other input to amplitude/phase detector correlator 64 is the down-converted residual signal sum $S_i+S_j$. Amplitude/phase detector correlator 64 suppresses signals other than $S_i$ and $S_i+S_j$.

On the assumption that a pre-trigger pulse is available from interfering transmitter 24, as could be the case where interfering transmitter 24 and receive antenna 28 are located on the same ship, the analog-to-digital sampling time of analog-to-digital converter 68 relative to the pre-trigger pulse is precisely set in accordance with the present invention using the digital delay generator 70 which receives both the pre-trigger pulse and digital instruction from computer 42. Thus, digital delay generator 70 is under control of computer 42 to establish the A/D sampling time of A/D converter 68. The delay-time algorithm for residual interference sampling is implemented in the computer listing of Appendix I. This delay time algorithm is executed to precisely evaluate the signal levels measured over a range of delay times and to determine the optimum delay, i.e. the maximum sampled signal level. Once the A/D sampling time, or the digital delay generator 70 time delay, is determined, the computer 42 enters the residual minimization algorithm which adjusts the amplitude and phase of the signal input to vector modulator 48. Computer 42 then adjusts the delay through computer controlled RF delay line 40 to further minimize the residual signal and again adjusts phase and amplitude via vector modulator 48 to minimize the residual. Unless antennas 26 and 28 are moving with respect to each other no further adjustments are required in the RF delay so that all additional refinements and minimization can be accomplished through phase and amplitude adjustments via vector modulator 48.

Obviously, many modifications and variations of the present invention are possible in the light of the above teachings. It is therefore to be understood that within the scope of the appended claims the invention may be practiced otherwise than as specifically described.

Navy Case No. 70,739

Willard M. Cronyn

APPENDIX I

SOURCE CODE LISTING

FOR COMPUTER 42

```
10   ! 13 JAN 1988    18:27
20   ! RE-STORE "CAN_NEW"
30   ! LOADSUB ALL FROM "MULTI_LIB"
40   ! First statement of MULTI_LIB: FIND "CSUB Lib14753a"
50   ! ITERATIVE-CALCULATION MODE CANCELLER CONTROL SOFTWARE
60   ! UPGRADES: (1) Why does canceller oscillate with some changes
70   !    in Atten?; (2) Output to VM#1 ONLY if there is a change
80   !    in parameters
90   ! Log amp decision levels must be examined for mod under different
100  ! conditions
110  PRINT "DID YOU DO LOADSUB ALL FROM
'/APPLICATIONS/HP14753A/CONFIG/MULTI_LIB' IMMEDIATELY AFTER
LOAD '/CAN_NEW'?"
120  PRINT "AFTER 1ST RUN, DO RUN 590 - NOW WAIT 2 SECONDS"
130  WAIT 2
140  OPTION BASE 0
150  COM /Names/ Vm_i,Vm_sa,Ad_en,Vm1_sel,Vm2_sel ! DO NOT REMOVE Ad_en
160         ! unless config menu is changed
170  COM /Names/ Vm_q,Ddl
180  COM /Names/ V_t1,V_t2,V_t3,Buf
190  COM /Gen_global/ Avg_i,Avg_q,Avg_loga,Num_sam,Res,Ph
200  COM /Tr/ INTEGER Ind,Wantr$[2],Vtr$[2],Loop$[2]
210  DIM Subr$[20]
220  INTEGER Vm1(2),Vm1_sav(2),Del_vm(2)
230  REAL Del_vmcw_mag,Scale
240  !COMPLEX Del_Inj,Del_inj_t,Del_resid,Del_vmcw
250  !COMPLEX Inj,Inj_sav,Inj_t,Resid,Resid_neg,Resid_sav
260  !COMPLEX Vmcw,Vmcwa,Vmcwr,Vmcw_sav,Vmcw1,Vmcw1_sav
270  !COMPLEX Vmcw2,Vmcw2_sav,Vt,Null,Vec
```

```
280 REAL Del_inj(1),Del_inj_t(1),Del_resid(1),Del_vmcw(1)
290 REAL Inj(1),Inj_sav(1),Inj_t(1),Resid(1),Resid_neg(1),Resid_sav(1)
300 REAL Vmcw(1),Vmcwa(1),Vmcwr(1),Vmcw_sav(1),Vmcw1(1),Vmcw1_sav(1)
310 REAL Vmcw2(1),Vmcw2_sav(1),Vt(1),Null(1),Vec(1)
320 REAL Trans(0:1,0:1),Trans_inv(0:1,0:1),Trans_inv_neg(0:1,0:1)
330 !
340 Off=1    !High is FALSE
350 On=0     !Low is TRUE
360 !Set default trig args to deg:
370 DEG
380 Del_atten_min=10*LGT((1+254_2)/254_2)  ! Min change in atten
390 Num_sam=17
400 ! Following configures DOC for VM#1, VM#2 and RFDL; A/D's for Vmcw,
410 !  Log a
420 Inmin$="Y"
430 INPUT "Want minimum input parameters ('y'/n)?",Inmin$
440 Inmin$=UPC$(Inmin$)
450 !
460 IF Inmin$="Y" THEN
470    Skp$="Y"
480 ELSE
490    Skp$="Y"
500    INPUT "Want to skip Config ('y'/n)?",Skp$
510    Skp$=UPC$(Skp$)
520 END IF ! Inmin$=Y
530 !
540 IF Skp$="Y" THEN GOTO 590
550 Configure("MENU_OFF","MAT_CAN")
560 !
570 !**********************************************************
580 !
590 Initialize:  !
600    GOSUB Set_flags
610    Ind=-1 ! Indent counter
620 !
630    IF Inmin$="Y" THEN
640       Wantr$="N"
650       Vtr$="N"
660    ELSE
670       Wantr$="N"
680       INPUT "Want to trace through subroutines (y/'n')?",Wantr$
690       Wantr$=UPC$(Wantr$)
700       Vtr$="N"
710       INPUT "Want to trace parameter values (y/'n')?",Vtr$
720       Vtr$=UPC$(Vtr$)
730    END IF ! Inmin$=Y
740 !
750    IF Wantr$="Y" THEN PRINT "Matrix Canceller Program Sequence"
760    System_init
770 !
780    IF Inmin$="Y" THEN
790       Int_del=47 ! Best for up to 1 MHz Tri wave frq
800    ELSE
810       INPUT "Specify RF delay increments",Int_del
820    END IF ! Inmin$=Y
830 !
840    PRINT DATE$(TIMEDATE),TIME$(TIMEDATE)
850    GOSUB Input_dint ! {Int_del} This also puts out control data to DDL
860    GOSUB Vm_init
```

```
870  !
880  IF Inmin$="Y" THEN
890    Skp$="Y"
900  ELSE
910    Skp$="Y"
920    INPUT "Want to skip Sam_vmax ('y'/n)?",Skp$
930    Skp$=UPC$(Skp$)
940  END IF ! Inmin$=y
950  !
960  IF Skp$="Y" THEN GOTO 990
970  CALL Sam_vmax
980  !
990  IF Inmin$="Y" THEN
1000   Loop$="Y"
1010 END IF ! Inmin$=Y
1020 !
1030 Flg_cyc=1 ! This is a cycling flag - set to 0 when system algorithm
1040         ! has to be re-set due to breaking of canceller null
1050 Begins_here:!
1060 GOSUB Input_dint ! {Int_del} This also puts out control data to DDL
1070 GOSUB Set_flags
1080 GOSUB Vm_init
1090 GOSUB In_param
1100 ! ###### DELETE NEXT 2 LINES FOR CYCLICAL MEASUREMENTS #######
1110 Want$="Y"
1120 INPUT "WANNA START NOW ('y'/n)?",Want$
1130 Want$=UPC$(Want$)
1140 IF Want$<>"Y" THEN GOTO 1120
1150 Cancel_loop: ! This is where system is reinitialized if null
1160            !lock broken
1170 GOSUB Vm_init
1180 GOSUB R_params ! Read, then get both loga components Cos_r/Sin_r
1190            ! and Cos/Sin components Avg_i/q from phase det.
1200 Resid(0)=Cos_r
1210 Resid(1)=Sin_r
1220 MAT Resid_sav= Resid
1230 ! Now set VM#1 to output approx same amp as uncan sig:
1240 Ang=0
1250 GOSUB U_match ! This injects sig with Atten(VM#1)= -Rdb1_sav, Phz=Ang
1260 Calc_loop: !
1270 ! Get new A,Ang:
1280 GOSUB New_inj
1290 MAT Vmcw1_sav= Vmcwr
1300 Rdb1_sav=Rdbvm
1310 MAT Vm1_sav= Vm1
1320 !
1330 IF ((Avg_loga<.3) AND (Flg_mina2=1)) THEN
1340   GOSUB Hisen_vm2 ! Decreases VM#2 atten and takes new reading
1350   GOSUB New_inj
1360 END IF ! Avg_loga<0.3
1370 !
1380 GOSUB Vm_set_anal
1390 ! PRINT "Atten/Phase of VM#1: ";INT(100*(-Rdb)+.5)/100;" / ";Ang, ! #####
1400 ! PRINT "VM CW: ";Vmcwr(0);"/";Vmcwr(1);"  Res: ";INT(1000*Res+.5)/1000  ! #########
1410 !
1420 IF Flg_null=0 AND Flg_cvm=1 THEN
1430   PRINT "Atten/Phase of VM#1: ";INT(100*(-Rdb)+.5)/100;" / ";Ang,
```

```
1440 PRINT "VM CW: ";Vmcwr(0);"/";Vmcwr(1);"  Res: ";INT(1000*Res+.5)/1000
1450      !         TAKE         READING         ON         SPECT. ANAL.###########################
1460 BEEP
1470 END IF    ! Flg_null=0
1480    !
1490 ! END Calc_loop
1500 GOTO Calc_loop
1510 GOTO Exit
1520 !****************************************************************
1530 !*                                  *
1540 !           SUBROUTINES FOR MAIN PROGRAM
1550 !****************************************************************
1560 !*                                  *
1570 Set_flags: !
1580 Subr$="Set_flags"
1590 IF Wantr$="Y" THEN CALL Indent(Ind,Subr$)
1600 Flg_null=1 ! This flag set to 0 once a null has been found
1610 Flg_mina2=1 ! This flag set to 0 when min atten has been set on VM#2.
1620 Flg_cvm=1 ! Flag set to 0 when there has been no change in state of
1630     ! VM#1 as determined by whether change in atten is > Del_atten_min
1640 Ind=Ind-1
1650 RETURN ! Set_flags
1660 !****************************************************************
1670 !*                                  *
1680 In_param: ! Input/display various parameters
1690         ! <C_t,M_t,M_tc,
1700 !OUTPUT 1;"Number of samples/data block: ";Num_sam
1710 Subr$="In_param"
1720 IF Wantr$="Y" THEN CALL Indent(Ind,Subr$)
1730 C_t=65.7
1740 M_t=23 ! mv/db
1750 Null(0)=0
1760 Null(1)=0
1770 MAT Inj= Null
1780 MAT Inj_sav= Null
1790 Ind=Ind-1
1800 RETURN ! In_param
1810 !****************************************************************
1820 !*                                  *
1830 Input_dint:! [Int_del]
1840 Subr$="Input_dint"
1850 IF Wantr$="Y" THEN CALL Indent(Ind,Subr$)
1860 !
1870 IF Int_del<0 THEN
1880 !
1890   IF Wantr$="Y" THEN
1900     PRINT "Int_del out of range"
1910   END IF! Wantr$="Y"
1920 !
1930   GOTO Input_dint
1940 END IF !Int_del<0
1950 !
1960 IF Int_del>127 THEN
1970   OUTPUT 1;"Int_del out of range"
1980   GOTO Input_dint
1990 END IF !Int_del>127
2000 !
2010 Output(Ddl,Int_del)
```

```
2020 P_pred=-INT(100*81.02*Int_del+.5)/100
2030 Ind=Ind-1
2040 RETURN ! Input_dint
2050 !*******************************************************************
2060 !*                                    *
2070 Vm_set: ! [I_vm,In,{A,Ang!X,Y!Vmcw,Sa}]
2080 Subr$="Vm_set"
2090 IF Wantr$="Y" THEN CALL Indent(Ind,Subr$)
2100 GOSUB Prev_vm_sel
2110 GOSUB Iqs_calc
2120 GOSUB Put_out
2130 Ind=Ind-1
2140 !
2150 IF Ind<-1000 THEN Ind=0 ! Reset Ind to avoid integer underflow if Wantr$="N"
2160 RETURN      ! Vm_set
2170 !*******************************************************************
2180 !*                                    *
2190 Vm_init: ! Initialize VM#1/2
2200 Subr$="Vm_init"
2210 IF Wantr$="Y" THEN CALL Indent(Ind,Subr$)
2220 In=1 ! For specifying A/Ang control of VM#1/2
2230 !
2240 FOR I_vmset=2 TO 1 STEP -1
2250   I_vm_prev=I_vm
2260   I_vm=I_vmset
2270   Ang=0
2280   SELECT I_vmset
2290   CASE 1
2300     A=90! For max atten
2310   CASE 2
2320     A=30.13
2330   END SELECT! I_vmset
2340   GOSUB Ivm_select
2350   GOSUB Iqs_calc
2360   GOSUB Put_out
2370   !GOSUB Vm_set
2380 NEXT I_vmset
2390 !
2400 Ind=Ind-1
2410 RETURN ! Vm_init
2420 !*******************************************************************
2430 !*                                    *
2440 U_match: ! Must enter with proper Ang; use ONLY for initial match
2450 Subr$="U_match"
2460 IF Wantr$="Y" THEN CALL Indent(Ind,Subr$)
2470 A=INT(100*(Rdb2_sav+C_t-Avg_loga/(M_t/1000)+.5))/100
2480 I_vm=1
2490 In=1 ! To select data via atten/phz
2500 !
2510 IF A<0 THEN
2520   PRINT "Atten for VM#1 <0, probably out of range: ";A
2530   A=0
2540 END IF ! A<0
2550 !
2560 GOSUB Vm_set_anal
2570 Ind=Ind-1
2580 RETURN ! U_match
2590 !*******************************************************************
2600 !*                                    *
```

```
2610 Hisen_vm2:  ! High sens setting of VM#2
2620 Subr$="Hisen_vm2"
2630 IF Wantr$="Y" THEN CALL Indent(Ind,Subr$)
2640 I_vm_prev=I_vm
2650 A1_sav=A  ! Save A as determined in New_inj
2660 Ang1_sav=Ang
2670 I_vm=2
2680 In=3  ! For Vmcw/Sa
2690 Vmcwa(0)=255
2700 Vmcwa(1)=0
2710 Sa=2
2720 GOSUB Vm_set
2730 I_vm_prev=I_vm
2740 I_vm=1  ! Back to VM#1
2750 In=1
2760 Flg_mina2=0
2770 !PRINT "VM#2 atten reduced by 18 db"
2780 GOSUB R_params
2790 MAT Resid_sav= Resid  ! Anti-phased phasor will be added to Resid;
2800 Resid(0)=Avg_i
2810 Resid(1)=Avg_q
2820 A=A1_sav
2830 Ang=Ang1_sav
2840 GOSUB Vm_set_anal
2850 Ind=Ind-1
2860 RETURN  ! Hisen_vm2
2870!*************************************************************
2880!*                                                           *
2890 New_inj:  ! Have found Matrix Trans=(Del_resid)/(Del_inj) so will now
2900          ! use it to calc new Del_inj such that Del_inj_new=
2910          ! -Resid/Trans, thus reducing Resid to approx 0.
2920 Subr$="New_inj"
2930 IF Wantr$="Y" THEN CALL Indent(Ind,Subr$)
2940 MAT Trans_inv= INV(Trans)
2950 MAT Trans_inv_neg= (-1)*Trans_inv
2960 MAT Resid_neg= (-1)*Resid
2970 MAT Del_inj_t= Trans_inv*Resid_neg  ! This is only a trial Del_inj;
2980     ! it is not the final Del_inj because (1) it may correspond to less
2990     ! than the minimum possible change in VM#1 and (2) it has not been
3000     ! integerized
3010 MAT Inj_t= Inj+Del_inj_t
3020 !
3030 IF Vtr$="Y" THEN
3040   CALL T_par(Trans_inv_neg(*),Sc,Phs)
3050   PRINT "Previous Inj: ";
3060   CALL P_print(Inj(*))
3070   PRINT "Trial del_inj: ";
3080   CALL P_print(Del_inj_t(*))
3090   PRINT "Final new trial inj: ";
3100   CALL P_print(Inj_t(*))
3110   PRINT "Amp/Phase of Nulling Matrix: ";Sc;" / ";Phs
3120 END IF  ! Vtr$=Y
3130 !
3140 !CALL Vatn2(Inj_t(*),R1,Z)
3150 !CALL Vatn2(Inj(*),R0,Z)
3160 !Dbc=10*ABS(LGT(R1/R0))
3170 !PRINT "Db change in Inj: ";10*ABS(LGT(R1/R0))
3180 !
3190 CALL Vatn2(Inj_t(*),Sqr_resp,Ang)  ! Sqr_resp is the amplitude of the
```

```
3200      ! response relative to the reference state 255,0,0
3210  A=-20*LGT(Sqr_resp)  ! Sqr_resp is an amplitude so must do 20*LGT
3220  In=1  ! For input of atten,phase
3230  I_vm=1
3240  Ind=Ind-1
3250  RETURN    ! New_inj
3260  !****************************************************************
3270  !*                                          *
3280  Vm_set_anal:  !
3290  Subr$="Vm_set_anal"
3300  IF Wantr$="Y" THEN CALL Indent(Ind,Subr$)
3310  GOSUB Vm_set
3320  GOSUB Del_resid_calc
3330  !
3340  CALL Vatn2(Del_inj(*),V_r,Z)
3350  !
3360  IF Flg_cvm=1 THEN
3370    CALL Vec_div(Del_resid(*),Del_inj(*),Trans(*))
3380  END IF  ! Flg_cvm=1
3390  !
3400  Vt(0)=Trans(0,0)  ! Cos
3410  Vt(1)=Trans(1,0)  ! Sin
3420  !
3430  IF Res>1. AND Flg_null<1 THEN  ! Null lock broken
3440    PRINT "Null lock broken, algorithm reset"
3450    Flg_cyc=0
3460    GOSUB Set_flags
3470    GOTO Cancel_loop
3480  END IF   ! Res>1. & Flg_null<1
3490  !
3500  IF Res<.2 THEN   ! Res COM variable from SUB Read
3510  !
3520    IF Wantr$="Y" THEN
3530      PRINT ""
3540      PRINT "Atten/Phase of VM#1: ";INT(100*(-Rdb)+.5)/100;" / ";Ang
3550      PRINT ""
3560    END IF! Wantr$="Y"
3570  !
3580    !INPUT "WANNA DO IT AGAIN (y/n)?",Wan$
3590    !IF Wan$="Y" THEN GOTO Begins_here
3600    IF Loop$="N" THEN GOTO Exit
3610  END IF    ! Res<.2
3620  !
3630  Ind=Ind-1
3640  RETURN   ! Vm_set_anal
3650  !****************************************************************
3660  !*                                          *
3670  R_params:  !
3680  Subr$="R_params"
3690  IF Wantr$="Y" THEN CALL Indent(Ind,Subr$)
3700  CALL Read
3710  CALL Atn2(Avg_i,Avg_q,Phz_r)
3720  !
3730  Avg_r=SQR(Avg_i 2+Avg_q 2)
3740  !PRINT "Log_amp: ";Avg_loga  ! ###
3750  !
3760  IF Flg_mina2=1 THEN
3770    Db_r=Avg_loga*1000/M_t-Rdb2_sav
3780    Amp_r=10^(Db_r/20)
```

```
3790   Cos_r=Amp_r*COS(Phz_r)
3800   Sin_r=Amp_r*SIN(Phz_r)
3810 END IF   ! Flg_mina2=1
3820 !
3830 Ind=Ind-1
3840 RETURN   ! R_params
3850 !*****************************************************************
3860 !*                                *
3870 Del_resid_calc:  ! Find Params of change in residual sig.
3880 Subr$="Del_resid_calc"
3890 IF Wantr$="Y" THEN CALL Indent(Ind,Subr$)
3900 GOSUB R_params
3910 !
3920 IF Flg_cvm=1 THEN   ! If there was no change in Inj then don't change
3930    ! ref Resid_sav
3940   MAT Resid_sav= Resid
3950 END IF ! Flg_cvm=1
3960 !
3970 SELECT Flg_mina2
3980 CASE 1   ! Using measurements of loga
3990   Resid(0)=Cos_r! Cos component of residual
4000   Resid(1)=Sin_r! Sin component of residual
4010   !
4020 CASE 0   ! Using measurements of Cos/Sin from phase det.
4030   Resid(0)=Avg_i
4040   Resid(1)=Avg_q
4050 END SELECT
4060   !
4070 MAT Del_resid= Resid-Resid_sav
4080 CALL Vatn2(Del_resid(*),Del_resid_r,Del_resid_ph)
4090 !
4100 IF Vtr$="Y" THEN
4110   PRINT "Resid: ";
4120   CALL P_print(Resid(*))
4130   PRINT "Resid_sav: ";
4140   CALL P_print(Resid_sav(*))
4150   PRINT "Del_resid (R/A): ";
4160   CALL P_print(Del_resid(*))
4170 END IF  !Vtr$=Y
4180 !
4190 Ind=Ind-1
4200 RETURN  ! Del_resid_calc
4210 !*****************************************************************
4220 !*                                *
4230 Prev_vm_sel:   !
4240 Subr$="Prev_vm_sel"
4250 IF Wantr$="Y" THEN CALL Indent(Ind,Subr$)
4260 GOSUB Ivm_select
4270 !
4280 IF I_vm<>I_vm_prev THEN
4290   Vm_prev$="-" ! Initial value before 1st VM is set
4300   SELECT I_vm_prev
4310   CASE 1
4320     Vm_prev$="#1"
4330   CASE 2
4340     Vm_prev$="#2"
4350   END SELECT
4360 END IF    !Iv1$<>...
4370 !
```

```
4380 Ind=Ind-1
4390 RETURN    ! Prev_vm_sel
4400 !*************************************************************
4410 !*                              *
4420 Ivm_select:!
4430 Subr$="Ivm_select"
4440 IF Wantr$="Y" THEN CALL Indent(Ind,Subr$)
4450 !
4460 IF I_vm=1 THEN
4470   Ivm1=On
4480   Ivm2=Off
4490 ELSE
4500   Ivm1=Off
4510   Ivm2=On
4520 END IF ! I_vm=1
4530 !
4540 Ind=Ind-1
4550 RETURN ! Ivm_select
4560 !*************************************************************
4570 !*                              *
4580 Iqs_calc: !
4590 Subr$="Iqs_calc"
4600 IF Wantr$="Y" THEN CALL Indent(Ind,Subr$)
4610 SELECT In ! CASE 2 will not appear for auto_can
4620 ! Must enter with A/Ang or Vmcwa/Sa for auto_can
4630 CASE 1 ! Spec of Atten w.r.t. reference state of 255,0,0
4640 !
4650 Input_gnp: !
4660 !
4670    IF A>91 THEN
4680      PRINT "Attenuation requested is too high, A: ";A
4690      OUTPUT 1;"Attenuation requested is too high"
4700      GOTO Exit
4710    END IF      !A>90
4720 !
4730    IF A<0 THEN
4740      PRINT "Attenuation requested is A: ";A
4750      INPUT "Want to Continue with A=0 (y/n)?",Wan$
4760      Wan$=UPC$(Wan$)
4770      IF Wan$<>"Y" THEN
4780        GOTO Exit
4790      ELSE
4800        A=0
4810      END IF   ! Wan$<>Y
4820      Inmin$="Y"
4830      INPUT "Want minimum input parameters (y/'n')?",Inmin$
4840      Inmin$=UPC$(Inmin$)
4850      IF Inmin$="Y" THEN
4860        Loop$="Y"
4870      END IF! Inmin$=Y
4880      Wantr$="Y"
4890      INPUT "Want to trace through subroutines ('y'/n)?",Wantr$
4900      Wantr$=UPC$(Wantr$)
4910      Vtr$="Y"
4920      INPUT "Want to trace parameter values ('y'/n)?",Vtr$
4930      Vtr$=UPC$(Vtr$)
4940      INPUT "Want to print output (y/n)?",Wan_prt$
4950      Wan_prt$=UPC$(Wan_prt$)
4960      IF Wan_prt$="Y" THEN PRINTER IS PRT
```

```
4970   END IF      !A<0
4980 !
4990   Ag=-A    !Must convert to gain
5000   GOSUB Vm_param
5010 !*********************************************************************
5020 !*                                    *
5030 CASE 2
5040 !
5050 Input_ph: !
5060 !
5070   Rat=(X 2+Y 2)
5080 !
5090   IF X=0 THEN
5100     Ang=SGN(Y)*90.
5110   ELSE
5120     Ang=ATN(Y/X)
5130   END IF !X=0
5140 !
5150   IF X<0 THEN Ang=Ang-180
5160   IF Ang<-180 THEN Ang=Ang+360
5170   Ag=10*LGT(Rat)
5180 !
5190  ·IF Ag<-90 THEN
5200     OUTPUT 1;"Attenuation requested is too high"
5210     GOTO Input_ph
5220   END IF      !A<-90
5230 !
5240   GOSUB Vm_param
5250 !
5260 CASE 3
5270   ! Direct spec of Vmcw, Sa
5280   CALL Vatn2(Vmcwa(*),Rsqr,Ang)
5290   R=Rsqr*Rsqr/65025 ! 65025=255 2
5300   A=Sa*6.02-10*LGT(R)
5310   Ag=-A    ! Gain
5320   GOSUB Vm_param   ! Must re-set Vmcwa
5330 END SELECT  ! In
5340 !
5350 Angvm=Ang
5360 Rdbvm=Rdb
5370 GOSUB Id_vmparam
5380 Ind=Ind-1
5390 RETURN ! Iqs_calc
5400 !*********************************************************************
5410 !*                                    *
5420 Vm_param: ! Calc control words for Vector Modulator for CASE 1 or CASE 2
5430        ! of Iqs_calc or CASE 3 if entered with 128 2>(Ia 2+Qa 2)>255 2
5440        !   Ia=Vmcwa(0), Qa=Vmcwa(1)
5450 Subr$="Vm_param"
5460 IF Wantr$="Y" THEN CALL Indent(Ind,Subr$)
5470 Sa=INT(-Ag/6.0199) ! Use 6.02- to avoid round-off errs
5480 Sa=MIN(Sa,7)
5490 Sar=Sa
5500 Va=10 ((6.02*Sa+Ag)/20)
5510 IF Ang<-180 THEN Ang=Ang+360
5520 IF Ang>+180 THEN Ang=Ang-360
5530 Vmcwa(0)=255*Va*COS(Ang)
5540 Vmcwa(1)=255*Va*SIN(Ang)
5550 !PRINT "OLD VM: ";Vmcwr(0);"/";Vmcwr(1)
```

```
5560 Vmcwr(0)=INT(ABS(Vmcwa(0))+.5)*SGN(Vmcwa(0))   ! Rounded
5570 Vmcwr(1)=INT(ABS(Vmcwa(1))+.5)*SGN(Vmcwa(1))
5580 !PRINT "NEW VM: ";Vmcwr(0);"/";Vmcwr(1)
5590 R=DOT(Vmcwr,Vmcwr)/65025.
5600 Rl=-10*LGT(R)
5610 Rdb=-(Rl+Sa*6.02)
5620 !
5630 IF I_vm=2 THEN Rdb2_sav=Rdb
5640 !
5650 CALL Atn2(Vmcwr(0),Vmcwr(1),Ang)
5660 Ang=SGN(Ang)*INT(100*ABS(Ang)+.5)/100
5670 MAT Vmcw= Vmcwr
5680 IF Vmcwr(0)<0 THEN Vmcw(0)=256-Vmcwr(0)
5690 IF Vmcwr(1)<0 THEN Vmcw(1)=256-Vmcwr(1)
5700 Ind=Ind-1
5710 RETURN   ! Vm_param
5720 !**************************************************************
5730 !*                              *
5740 Id_vmparam: !
5750 Subr$="Id_vmparam"
5760 IF Wantr$="Y" THEN CALL Indent(Ind,Subr$)
5770 SELECT I_vm
5780 CASE 1
5790   MAT Vmcw1= Vmcwr
5800     ! Now calculate the phasor specified by the VM#1 control word:
5810   Scale=(10 (Rdbvm/20))/SQR(DOT(Vmcwr,Vmcwr))
5820   ! Inj will be the phasor normalized to the reference state of
5830   ! the VM. For given I,Q,Sa R=[10 (-6.02*Sa/20)]*SQR(I 2+Q 2)/255
5840   ! with phase angle of Atan(Q/I).
5850   ! Rdb=-6.02*Sa+10*LGT(I 2+Q 2)-20*LGT(255). It is -Rdb which is the
5860   ! attenuation w.r.t. reference state, and Atan(Q/I) which is phase.
5870   MAT Inj_sav= Inj
5880   MAT Inj= (Scale)*Vmcwr
5890   S=Scale
5900   MAT Del_inj= Inj-Inj_sav
5910   !
5920   IF Vtr$="Y" THEN
5930     PRINT "Sa: ";Sa;" Inj: ";INT(100*Inj(0)/S)/100;"/";
5940     PRINT INT(100*Inj(1)/S)/100;
5950     PRINT " Inj_sav: ";INT(100*Inj_sav(0)/S)/100;"/";
5960     PRINT INT(100*Inj_sav(1)/S)/100;
5970     PRINT "Del_inj: ";INT(100*Del_inj(0)/S)/100;"/";
5980     PRINT INT(100*Del_inj(1)/S)/100;" R/A: ";
5990     MAT Vec= Del_inj/(S)
6000     CALL P_print(Vec(*))
6010   END IF  ! Vtr$=Y
6020   !
6030   Vm1(0)=Vmcwr(0)
6040   Vm1(1)=Vmcwr(1)
6050   Vm1(2)=Sa
6060   !
6070   IF Flg_mina2=0 THEN
6080     CALL Vatn2(Inj(*),R1,Z)
6090     CALL Vatn2(Inj_sav(*),R0,Z)
6100     Dbc=20*ABS(LGT(R1/R0))
6110 !
6120 !PRINT "Res: ";INT(1000*Res)/1000
6130     IF Dbc<.9*Del_atten_min THEN
6140       Flg_cvm=0
```

```
6150      Flg_null=0  ! This is really only done once since Flg_null not
6160      ! reset until null-track broken
6170      !PRINT "Flg_cvm reset to 0; Dbc= ";INT(100000*Dbc)/100000 ! ###
6180      IF Dbc>1.E-12 THEN
6190        PRINT "Db change in Inj: ";Dbc
6200        Sf=255*10 (.301*Sa)
6210        PRINT "Inj: ";Inj(0)*Sf;"/";Inj(1)*Sf;
6220        PRINT "  Inj_sav: ";Inj_sav(0)*Sf;"/";Inj_sav(1)*Sf;
6230      END IF ! 1.E-12<Dbc
6240    ELSE
6250      Flg_cvm=1
6260      !PRINT "Flg_cvm set to 1; Dbc= ";INT(100000*Dbc)/100000 ! ###
6270    END IF ! Dbc<.9*Del_atten_min
6280    !
6290    END IF! Flg_mina2=0
6300 !
6310    Sa1=Sa
6320    Rdb1=Rdbvm
6330    Ang1=Angvm
6340 CASE 2
6350    MAT Vmcw2= Vmcwr
6360    Sa2=Sa
6370    Rdb2=Rdbvm
6380    Ang2=Angvm
6390 END SELECT  ! I_vm
6400 Ind=Ind-1
6410 RETURN ! Id_vmparam
6420 !****************************************************************
6430 !*                                *
6440 Put_out: !
6450 Subr$="Put_out"
6460 IF Wantr$="Y" THEN CALL Indent(Ind,Subr$)
6470 Output(Vm1_sel,Ivm1)
6480 Output(Vm2_sel,Ivm2)
6490 Output(Vm_i,Vmcw(0))
6500 Output(Vm_q,Vmcw(1))
6510 Output(Vm_sa,Sa)
6520 !Must strobe in I,Q (Vmcw) then disable
6530 Output(Vm1_sel,Off)
6540 Output(Vm2_sel,Off)
6550 Ind=Ind-1
6560 RETURN ! Put_out
6570 !****************************************************************
6580 !*                                *
6590 Exit: !
6600 END    ! Main Program
6610 !****************************************************************
6620 !*                                *
6630 SUB Atn2(Rx,Ry,Ang)
6640 !
6650    IF Rx=0 THEN
6660      Ang=SGN(Ry)*90
6670    ELSE
6680      Ang=ATN(Ry/Rx)
6690      IF Rx<0 THEN
6700        Ang=Ang-180
6710        IF Ang<-180 THEN Ang=Ang+360
6720      END IF ! Rx<0
6730    END IF  ! Rx=0
```

```
6740  !
6750  Ang=INT(100*Ang)/100
6760  SUBEND
6770  !*******************************************************************
6780  !*                                                              *
6790  SUB Trans(A,Ang,T(*))
6800    COM /Tr/ INTEGER Ind,Wantr$[2],Vtr$[2],Loop$[2]
6810    Subr$="Trans"
6820    IF Wantr$="Y" THEN CALL Indent(Ind,Subr$)
6830  ! This sub configures a 2x2 matrix T to give a magnitude gain of A
6840  !   and a rotation of Ang degrees
6850    T(0,0)=A*COS(Ang)
6860    T(1,1)=T(0,0)
6870    T(1,0)=A*SIN(Ang)
6880    T(0,1)=-T(1,0)
6890    Ind=Ind-1
6900  SUBEND
6910  !*******************************************************************
6920  !*                                                              *
6930  SUB Vatn2(V(*),V_r,V_ang) ! Return mag/phase of vector V(0)=Vx,V(1)=Vy
6940    R=DOT(V,V)
6950    V_r=SQR(R)
6960    CALL Atn2(V(0),V(1),V_ang)
6970  SUBEND   ! SUB Vatn2
6980  !*******************************************************************
6990  !*                                                              *
7000  SUB Vec_div(V1(*),V2(*),T(*))
7010    COM /Tr/ INTEGER Ind,Wantr$[2],Vtr$[2],Loop$[2]
7020    Subr$="Vec_div"
7030    IF Wantr$="Y" THEN CALL Indent(Ind,Subr$)
7040  ! Find T such that T*V2=V1 or T=V1/V2
7050  !
7060    CALL Vatn2(V1(*),V1_r,V1_ang)
7070    CALL Vatn2(V2(*),V2_r,V2_ang)
7080    A=V1_r/V2_r
7090    Ang=V1_ang-V2_ang
7100    CALL Trans(A,Ang,T(*))
7110  ! PRINT "   Amp/ph of transfer fcn mat: ";A;"/";Ang ! ###########
7120  !
7130    IF Vtr$="Y" THEN
7140      PRINT "   Num: ";V1_r;"/";V1_ang;"  Denom: ";V2_r;"/";V2_ang
7150      PRINT "   Amp/ph of transfer fcn mat: ";A;"/";Ang
7160    END IF  ! Vtr$=Y
7170  !
7180    Ind=Ind-1
7190  SUBEND   ! Vec_div
7200  !*******************************************************************
7210  !*                                                              *
7220  SUB Read
7230  ! TAKE AND ANALYZE DATA FROM THE 3 MULTIPLEXED A/D'S ("TEST2_3AD")
7240  !        26 OCT 1987 10:48
7250    COM /Names/ Vm_i,Vm_sa,Ad_en,Vm1_sel,Vm2_sel
7260    COM /Names/ Vm_q,Ddl
7270    COM /Names/ V_t1,V_t2,V_t3,Buf
7280    COM /Gen_global/ Avg_i,Avg_q,Avg_loga,Num_sam,Res,Ph
7290    COM /Tr/ INTEGER Ind,Wantr$[2],Vtr$[2],Loop$[2]
7300    INTEGER B_t1(0:16,0:2)
7310    REAL V1(0:16),V2(0:16),V3(0:16)
7320    Subr$="Read"
```

```
7330    IF Wantr$="Y" THEN CALL Indent(Ind,Subr$)
7340    IF Num_sam<>17 THEN OUTPUT 1;"Oops - # data samples <> dim of data= 17"
7350    GOSUB Take_data
7360    CALL Stats(V1(*),Num_sam,Avg_i,Sigma_i)
7370    CALL Stats(V2(*),Num_sam,Avg_q,Sigma_q)
7380    CALL Stats(V3(*),Num_sam,Avg_loga,Sigma_loga)
7390    V_avg(0)=Avg_i
7400    V_avg(1)=Avg_q
7410    !
7420    IF Vtr$="Y" THEN
7430      PRINT "Amp, I/Q: ";Avg_i;"/";Avg_q;" Log_a: ";Avg_loga
7440    END IF ! Vtr$=Y
7450    !
7460    CALL Vatn2(V_avg(*),Res,Ph)
7470    !                               !
7480    !                               !
7490    GOTO Exit
7500 !*****************************************************************
7510 !*                                  *
7520 Take_data: !
7530    Subr$="Take_data"
7540    IF Wantr$="Y" THEN CALL Indent(Ind,Subr$)
7550    GOSUB Re_init
7560    Input_iblock(Buf,B_t1(*))
7570    Wait_for(Buf)
7580    Demultiplex(Buf,V_t1,B_t1(*),V1(*))
7590    Demultiplex(Buf,V_t2,B_t1(*),V2(*))
7600    Demultiplex(Buf,V_t3,B_t1(*),V3(*))
7610    Ind=Ind-1
7620    RETURN ! Take_data
7630 !*****************************************************************
7640 !*                                  *
7650 Re_init: ! Found that Init(buf) and Enable_extrig(V_tx) MUST be executed
7660    Init(Buf)
7670    Enable_extrig(V_t1)
7680    RETURN ! Re_init
7690 !*****************************************************************
7700 !*                                  *
7710 Exit:!
7720    Ind=Ind-1
7730 SUBEND! Read
7740 !*****************************************************************
7750 !*                                  *
7760 SUB Stats(X(*),N,Avg,Sig)
7770    Sum=0
7780    Sum_sqr=0
7790    FOR I=0 TO N-1
7800      Sum=Sum+X(I)
7810      Sum_sqr=Sum_sqr+X(I)*X(I)
7820    NEXT I
7830    Avg=Sum/N
7840    ! Do following only for special analysis
7850    !R=(Sum_sqr-N*Avg*Avg)/SQR(N*(N-1))
7860    !IF R<0 THEN R=0
7870    !Sig=SQR(R)*1000! Convert to millivolts
7880    Avg=INT(1000*Avg)/1000
7890    !Sig=INT(10*Sig)/10
7900 SUBEND ! Stats
7910 !*****************************************************************
```

```
7920 !*                                    *
7930 SUB P_print(V(*))  ! Prints amplitude/phase of a vector
7940   CALL Vatn2(V(*),R,Phz)
7950   PRINT INT(1000*R+.5)/1000;"/";INT(100*Phz)/100
7960 SUBEND  ! P_print
7970 !*****************************************************************
7980 !*                                    *
7990 SUB T_par(T(*),A,Ang)
8000   COM /Tr/ INTEGER Ind,Wantr$[2],Vtr$[2],Loop$[2]
8010   Subr$="T_par"
8020   IF Wantr$="Y" THEN CALL Indent(Ind,Subr$)
8030   ! This sub evaluates the magnitude and rotation phase of a matrix T
8040   REAL V(1)
8050   V(0)=T(0,0)
8060   V(1)=T(1,0)
8070   CALL Vatn2(V(*),A,Ang)
8080   Ind=Ind-1
8090 SUBEND
8100 !*****************************************************************
8110 !*                                    *
8120 SUB Indent(INTEGER I,Sub$)
8130   ! Sub for displaying program flow. If printing of parameter values is
8140   ! preceded by:
8150   !   FOR K=1 TO Ind
8160   !     PRINT "  ";
8170   !   NEXT K
8180   ! then values will be shown left-justified with sub in which they are
8190   INTEGER In,J
8200   I=I+1
8210   FOR J=1 TO I
8220     PRINT "  ";
8230   NEXT J
8240   PRINT Sub$
8250 SUBEND
8260 !*****************************************************************
8270 !*                                    *
8280 ! Do GET "SUB_VMAX:,700,1",LL  LL is last line of this prog
8290 ! Then LOADSUB ALL FROM "LIBRARY_4     "
8300 SUB Sam_vmax
8310 ! SUBPROGRAM TO FIND D.D.G. DELAY SUCH THAT LOG AMP PULSE IS
8320 ! SAMPLED AT MAX  ("CAN_VMAX1")
8330 ! CAN_VMAX1 is a subprogram; CAN_VMAX is stand-alone.
8340 !     3 NOV 1987 12:30
8350 !*****************************************************************
8360 !*                                    *
8370 ! BUG........BUG..........BUG  FOUND 11/3 9:44
8380 ! With 8116 at 525 kHz and #samples= 8, got Td=1E-17 msec. No
8390 ! problem for #= 4 or 6.
8400 !Details:
8410 !    This subprogram sets up the SRS Digital Delay
8420 !    Pulse Generator to send a trigger to an A/D card in-
8430 !    stalled in a HP6942A Multiprogrammer; the trigger is
8440 !    derived from the trigger out port of the 8116A function
8450 !    generator which modulates the 8673 sig gen to gen the
8460 !    simulated TACAN signal; the 8116 trigger corresponds to
8470 !    the TACAN pre-trigger pulse.
8480 !    The program
8490 !    initially takes Num_sam samples at delay intervals of
8500 !    1 usec from 0 to 16 usec and finds the delay which yields
```

```
8510 !  a max response. It then backs up from this delay by 1.2 usec
8520 !  and takes Num_sam*4 samples at delay intervals
8530 !  of 0.1 usec from Tmax-1.2 to Tmax+1.2 usec to find the max
8540 !  (Num_sam samples taken to improve S/N). Final search at
8550 !  increments of 10 nsec from Tmax-.12 to Tmax+.12, where
8560 !  Tmax is from search at inc. of 0.1 usec and Num_sam*4*4
8570 !  samples taken at each increment. Found that Num_sam=2
8580 !  fails, 3 marginal so use at least 4.
8590 !  The width of the DDG pulse is one microsecond.
8600 !
8610 !     The HP-IB-controlled SRS Digital Delay Generator must be
8620 !  given time to respond.
8630 !***********************************************************
8640 !
8650 !Setup For Test:
8660 !
8670 !  HP8116A Pulse Function Generator:
8680 !       Amplitude= +-1.45 v.
8690 !         Burst mode of operation, burst #= 1; output
8700 !         to detector to control input port of Mini-Circuits
8710 !         voltage-controlled attenuator;
8720 !          trigger output connects
8730 !       with the trigger input of the SRS Digital Delay
8740 !       Pulse Generator.
8750 !
8760 !  SRS Digital Delay Pulse Generator:
8770 !       All the condition settings are performed
8780 !       through HP-IB programming.
8790 !        A trigger input supplied by the trigger out-
8800 !       put of the HP8116A and the high A/B output will
8810 !       supply the trigger input for
8820 !       the HP6942A Multiprogrammer.
8830 !
8840 !***********************************************************
8850 !
8860   COM /Names/ Vm_i,Vm_sa,Ad_en,Vm1_sel,Vm2_sel! DO NOT REMOVE Ad_en
8870        ! unless config menu is changed
8880   COM /Names/ Vm_q,Ddl
8890   COM /Names/ V_t1,V_t2,V_t3,Buf
8900   COM /Gen_global/ Avg_i,Avg_q,Avg_loga,Num_sam,Res,Ph
8910 !
8920 !
8930   GOSUB Ddg_con
8940 !
8950 Run_loop:GOSUB Param_vmax
8960 !
8970   GOSUB Input_vmax
8980 !
8990 !
9000   GOSUB Search_loop    !First Search for maximum amplitude
9010   PRINT "For Del_t: ";Del_t;" Max V: ";INT(1000*Vm)/1000;" at T: ";Tm
9020 !
9030   GOSUB Search_fine
9040 !
9050   Td=Tm
9060   GOSUB Set_ddg
9070   PRINT "Done. DDG set to Tm (usec): ";Tm
9080 !
9090   GOTO Exit
```

```
9100 !************************************************************
9110 !*****             Sub-routines                        *****
9120 !************************************************************
9130 !
9140 Ddg_con: ! Configuring Digital Delay Generator
9150   ASSIGN @Dig_dg TO 715
9160 !
9170   OUTPUT @Dig_dg;"CL"    !Initializes the system
9180   OUTPUT @Dig_dg;"CS 1"    !Numeric Mode for time delay
9190   OUTPUT @Dig_dg;"TZ 4,1" !AB output to drive high-Z load
9200   OUTPUT @Dig_dg;"TZ 0,1" !Trigger input for high-Z load
9210   OUTPUT @Dig_dg;"OM 4,0" !Set TTL output
9220   OUTPUT @Dig_dg;"DL 1,0,0"!Displays the A channel delay
9230   OUTPUT @Dig_dg;"TM 1; TL 1.00; TS 1" !Sets the external trigger,
9240                           !threshold level, slope
9250   RETURN ! End of Ddg_con
9260 !************************************************************
9270 !*                                    *
9280 Param_vmax: !
9290 !*****       Initialization of parameters         *****
9300 !
9310   Tm=0!Initial time of max amp
9320   Vm=-99
9330   T_beg=0!Beginning of search range, usec
9340   Del_t=1!Initial search increment, usec
9350   T_end=8!End of initial search range, usec
9360   B$="DT 2,1,"
9370   RETURN ! Param_vmax
9380 !************************************************************
9390 !*                                    *
9400 Input_vmax: ! User parameters for vmax
      Num_samb
9410 !INPUT "How many data samples should be taken at each delay in coarse search?",
9420   Num_samb=1! Number of sample blocks taken in coarse, intermediate search.
9430 !
9440 !INPUT "Specify System Response Time, msec",R_time
9450   R_time=0! OK for Interpreter BUT may have to change for compiler
9460   R_time=R_time*1.E-3
9470   RETURN !Input_vmax
9480 !************************************************************
9490 !*                                    *
9500 Search_fine: ! Fine and finest resolution searches for max
9510   FOR I_search=1 TO 2
9520     IF I_search=2 THEN Num_samb=4 ! take 4 blocks instead of 1
9530     T_beg=Tm-1.2*Del_t!New search range is Tm+-1.2*del_t
9540     T_end=Tm+1.2*Del_t!
9550     Del_t=Del_t/10 !Cut increments by 10
9560     Vm=0!  Must reinitialize Vm, otherwise lower S/N may confuse
9570     GOSUB Search_loop      !Finer Searches for maximum amplitude
9580     PRINT "For Del_t: ";Del_t;" Max V: ";INT(10000*Vm)/10000;" at T: ";Tm
9590   NEXT I_search
9600   Td=Tm
9610   RETURN ! Search_fine
9620 !************************************************************
9630 !*                                    *
9640 !
9650 Search_loop: !
9660   Td=T_beg           !Initial value of delay
9670        !           Td is in units of usec
```

```
9680 Loop_beg:IF Td>T_end THEN GOTO Loop_exit
9690  !
9700    GOSUB Set_ddg
9710    GOSUB Get_v_avg
9720    IF V_avg>Vm THEN
9730      Vm=V_avg
9740      Tm=Td
9750    END IF
9760    Td=Td+Del_t
9770    GOTO Loop_beg
9780    !
9790    RETURN   !Search_loop
9800 !
9810 Loop_exit:  !
9820    RETURN ! Search_loop
9830 !*******************************************************************
9840 !*                             *
9850 !
9860 Set_ddg:    !
9870    Td_sec=Td*1.E-6
9880    IF Td_sec<1.E-9 THEN Td_sec=1.E-9
9890    Td$=VAL$(Td_sec)
9900    P$=B$&Td$
9910    OUTPUT @Dig_dg;P$              !Sets channel A delay time
9920    OUTPUT @Dig_dg;"DT 3,2,1E-6"   ! Sets AB pulse width and
9930                                   !sets channel B delay.
9940    T0=TIMEDATE! Start clock running after output to DDG
9950    RETURN ! Set_ddg
9960 !
9970 !*******************************************************************
9980 !*                             *
9990 Get_v_avg: !
10000   V_tot=0
10010   !
10020   FOR N=1 TO Num_samb
10030     GOSUB Time_loop! Do not take measurements until DDG set.
10040     CALL Read
10050     V_tot=V_tot+Avg_loga
10060   NEXT N
10070   V_avg=V_tot/Num_samb
10080   RETURN! Get_v_avg
10090 !*******************************************************************
10100 !*                             *
10110 Time_loop:  !
10120 !*******************************************************************
10130 !*     HP-IB + DDG MUST BE GIVEN TIME TO RESPOND         *
10140 !*******************************************************************
10150 !
10160 ! NOTE: MUST ALWAYS SET T0 *BEFORE* CALLING Time_loop
10170 ! Running under BASIC Interpreter, 0 delay required. Even commenting
10180 !   out all refs to Time_loop gave OK operation but removal of lines
10190 !   caused program to fail.
10200   T1=TIMEDATE
10210   Elapsed_time=T1-T0
10220   IF Elapsed_time<R_time THEN GOTO Time_loop
10230   RETURN ! Time_loop
10240 !*******************************************************************
10250 !*                             *
10260 Exit:SUBEND   !Sam_vmax
10270 !*******************************************************************
10280 !*                             *
```

I claim:

1. An interference canceller for cancelling an interfering signal, $S_i(t)$, generated by an interfering source from a transmission link between an antenna and a receiver comprising:
   first means for deriving a signal sample of said interfering signal $S_i(t)$;
   second means operably coupled to said first means for injecting a cancelling signal $S_j(t)$ derived from said signal sample into transmission link;
   third means operably coupled to said transmission link for sampling the residual signal $S_i(t)+S_j(t)$ in said transmission link; and
   fourth means comprising a computer operably coupled for receiving the output of said third means and for providing a digital signal input to said second means for minimizing said residual signal $S_i(t)+S_j(t)$, wherein said computer is programmed to calculate, using a minimization algorithm, the correction coefficients needed to minimize said residual signal and is also programmed to input the signals corresponding to said correction coefficients to said second means.

2. The interference canceller of claim 1 wherein:
   said first means comprises a directional coupler operably positioned to sense said interfering signal to thereby obtain said signal sample.

3. The interference canceller of claim 2 wherein said first means further comprises:
   fifth means for down converting said signal sample to an intermediate frequency signal sample.

4. The interference canceller of claim 1 wherein said second means comprises:
   modulator means operably coupled to said first means for selectively modulating the amplitude of said signal sample.

5. The interference canceller of claim 4 wherein said modulator means is further for phase shifting the phase of said signal sample so as to generate an amplitude modulated, phase shifted signal sample.

6. The interference canceller of claim 5 wherein said first means further comprises:
   fifth means for down converting said signal sample to an intermediate frequency signal sample.

7. The interference canceller of claim 4 wherein said second means further comprises a directional coupler operably coupled to said transmission link for injecting said cancelling signal into said transmission link.

8. The interference canceller of claim 1 wherein said third means comprises a directional coupler.

9. The interference canceller of claim 1 wherein said fourth means further comprises an amplitude/phase detector for measuring the phase and amplitude of said residual signal.

10. An interference canceller for cancelling an interfering signal, $S_i(t)$, generated by an interfering source from a transmission link between an antenna and a receiver comprising:
    first means for deriving a signal sample of said interfering signal $S_i(t)$;
    second means operably coupled to said first means for injecting a cancelling signal $S_j(t)$ derived from said signal sample into said transmission link;
    third means operably coupled to said transmission link for sampling the residual signal $S_i(t)+S_j(t)$ in said transmission link;
    fourth means comprising a computer operably coupled for receiving the output of said third means and for providing a digital signal input to said second means for minimizing said residual signal $S_i(t)+S_j(t)$, wherein said computer is programmed to calculate, using a minimization algorithm, the correction coefficients needed to minimize said residual signal and also programmed to input the signals corresponding to said correction coefficients to said second means; and further comprising:
    delay means operably coupled between said first means and said second means for introducing a propagation delay into said signal sample such that said cancelling signal $S_j(t)$ is injected into said transmission link at the same time that said interfering signal $S_i(t)$ appears in said transmission link.

11. The interference canceller of claim 10 wherein:
    said delay means comprises a radio frequency delay line.

12. The interference canceller of claim 11 wherein:
    said delay line has an adjustable delay.

13. An interference canceller for cancelling an interfering signal, $S_i(t)$, generated by an interfering source from a transmission link between an antenna and a receiver comprising:
    first means for deriving a signal sample of said interfering signal $S_i(t)$;
    second means, operably coupled to said first means, for deriving and injecting a cancelling signal $S_j(t)$ into said transmission link comprising a modulator for deriving said cancelling signal $S_j(t)$ by selectably modulating the amplitude and shifting the phase of said signal sample $S_i(t)$; and further comprising an up-converter operably coupled to the output of said modulator means;
    third means operably coupled to said transmission link for sampling the residual signal $S_i(t)+S_j(t)$ in said transmission link;
    fourth means comprising a computer operably coupled for receiving the output of said third means and for providing a digital signal input to said second means for minimizing said residual signal $S_i(t)+S_j(t)$, wherein said computer is programmed to calculate, using a minimization algorithm, the correction coefficients needed to minimize said residual signal and is also programmed to input the signals corresponding to said correction coefficients to said second means.

* * * * *